US008326599B2

(12) United States Patent
Tomeh et al.

(10) Patent No.: US 8,326,599 B2
(45) Date of Patent: Dec. 4, 2012

(54) BI-PHRASE FILTERING FOR STATISTICAL MACHINE TRANSLATION

(75) Inventors: Nadi Tomeh, Paris (FR); Nicola Cancedda, Grenoble (FR); Marc Dymetman, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 887 days.

(21) Appl. No.: 12/427,149

(22) Filed: Apr. 21, 2009

(65) Prior Publication Data

US 2010/0268527 A1   Oct. 21, 2010

(51) Int. Cl.
*G06F 17/28* (2006.01)
*G06F 17/27* (2006.01)
*G06F 17/21* (2006.01)
*G06F 17/30* (2006.01)
*G06F 9/26* (2006.01)

(52) U.S. Cl. ....... 704/4; 704/2; 704/9; 704/10; 707/740; 711/216

(58) Field of Classification Search ................. 704/2, 10
See application file for complete search history.

(56) References Cited

U.S. PATENT DOCUMENTS

| | | | |
|---|---|---|---|
| 6,182,026 B1 | 1/2001 | Tillman et al. | |
| 6,904,402 B1* | 6/2005 | Wang et al. | 704/10 |
| 6,917,936 B2 | 7/2005 | Cancedda | |
| 6,996,520 B2* | 2/2006 | Levin | 704/10 |
| 7,216,066 B2* | 5/2007 | Di et al. | 703/2 |
| 7,275,029 B1* | 9/2007 | Gao et al. | 704/9 |
| 7,454,326 B2 | 11/2008 | Marcu et al. | |
| 7,478,034 B2* | 1/2009 | Moore | 704/2 |
| 7,536,295 B2* | 5/2009 | Cancedda et al. | 704/4 |
| 7,542,893 B2* | 6/2009 | Cancedda et al. | 704/2 |
| 7,548,908 B2* | 6/2009 | Fu et al. | 1/1 |
| 7,634,632 B2* | 12/2009 | Suponau et al. | 711/216 |
| 7,720,675 B2* | 5/2010 | Burstein et al. | 704/9 |
| 7,788,265 B2* | 8/2010 | Morscher et al. | 707/740 |
| 7,925,493 B2* | 4/2011 | Watanabe et al. | 704/2 |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0067157 A1* | 3/2007 | Kaku et al. | 704/10 |
| 2007/0150257 A1 | 6/2007 | Cancedda et al. | |
| 2007/0265825 A1 | 11/2007 | Cancedda et al. | |
| 2008/0300857 A1 | 12/2008 | Barbaiani et al. | |

OTHER PUBLICATIONS

Fisher, *Fisher Exact Test, On-Line Exact Test Calculator with Examples*, available at: http://www.physics.csbsju.edu/stats/exact2.html, downloaded Apr. 8, 2009.
Fisher, *Fisher's Exact Test Applet Calculator*, dated 1997, available at: http://www.socr.ucla.edu/htmls/ana/FishersExactTest_Analysis.html. downloaded Apr. 7, 2009.

(Continued)

*Primary Examiner* — Pierre-Louis Desir
*Assistant Examiner* — Neeraj Sharma
(74) *Attorney, Agent, or Firm* — Fay Sharpe LLP

(57) ABSTRACT

A computer-implemented system and a method for pruning a library of bi-phrases, suitable for use in a machine translation system are provided. The method includes partitioning a bi-phrase library into a set of sub-libraries. The sub-libraries may be of different complexity such that, when pruning bi-phrases from the plurality of sub-libraries is based on a common noise threshold, a complexity of bi-phrases is taken into account in pruning the bi-phrases.

16 Claims, 8 Drawing Sheets

OTHER PUBLICATIONS

Fisher, *Fisher's Exact Test for Count Data*, available at: http://www.maths.lth.se/help/R/.R/library/stats/html/fisher.test.html, Oct. 26, 2006.

Fisher, Fisher's Exact Test, In *Wikipedia, The Free Encyclopedia*, Retrieved Oct. 21, 2008, from: http://en.wikipedia.org/wiki/Fisher_exact_test.

Fisher, R.A., On the Interpretation of $x^2$ from Contingency Tables, and the Calculation of P, *Journal of the Royal Statistical Society*, 85(1):87-94 (1922).

Johnson, J.H., et al., Improving Translation Quality by Discarding Most of the Phrasetable, *Proc. of the 2007 Joint Conf. on Empirical Methods in Natural Language Processing and Computational Natural Language Learning (EMNLP-CoNLL)*, pp. 967-975 (2007).

U.S. Appl. No. 11/789,089, filed Apr. 20, 2007, Pacull.

U.S. Appl. No. 11/969,314, filed Jan. 4, 2008, Cancedda, et al.

U.S. Appl. No. 12/404,412, filed Mar. 16, 2009, Faddoul, et al.

Mehta, C.R., et al., Exact Inference for Categorical Data, *Biometrics*, 53(1), 112-117 (Jan. 1, 1997).

Mehta, C.R., et al., Exact Significance Testing to Establish Treatment Equivalence with Ordered Categorical Data, *Biometrics*, 40(3) (Sep. 1984).

Moore, R.C., On Log-Likelihood-Ratios and the Significance of Rare Events, *Proc. of EMNLP, Assn. for Computational Linguistics*, pp. 333-340, Jul. 2004.

Simard, M., et al., Translating with Non-Contiguous Phrases, *Proc. of the Conf. on Human Language Technology and Empirical Methods in Natural Language Processing*, pp. 755-762 (2005).

Tomeh, N., Filtering of Phrasetables for Statistical Machine Translation Systems, *Master Thesis*, Grenoble, Jun. 2008.

Weisstein, E., Fisher's Exact Test, from *MathWorld, a Wolfram Web Resource*, available at: http://mathworld.wolfram.com/FishersExactTest.html, (copyright 1999-2009), downloaded Apr. 7, 2009.

* cited by examiner

BI-PHRASE FILTERING FOR STATISTICAL MACHINE TRANSLATION

BACKGROUND

The exemplary embodiment relates to the field of machine translation. It finds particular application in connection with the pruning of bi-phrases stored in a library of bi-phrases, and will be described with particular reference thereto.

Statistical machine translation (SMT) systems aim to find the most probable translation of a source language text in a target language. The system may be trained with bilingual corpora. These are source and target language texts that are mutual translations of each other. Phrase-based SMT systems have been developed which employ libraries (databases) of "bi-phrases," that is, pairs of the form <source-phrase, target-phrase>, which are learned automatically from the bilingual corpora. When given a new segment of text to translate, these systems search the library to extract all relevant bi-phrases, i.e., items in the library whose source-language phrase matches some portion of the new input. A subset of these matching bi-phrases is then identified, such that each word of the input text is covered by exactly one bi-phrase in the subset, and that the combination of the target-language phrases produces a coherent translation.

Conventionally, SMT systems use contiguous bi-phrases, i.e., each phrase is an uninterrupted sequence of words. Recently, SMT phrase-based systems have been developed which are able to accommodate non-contiguous bi-phrases. (See, for example, Michel Simard, et al., *Translating with non-contiguous phrases*, Proc. Conf. on Human Language Technology and Empirical Methods in Natural Language Processing, Morristown, N.J., USA (HLT '05), published by the Association for Computational Linguistics, pp. 755-762 (2005) and U.S. Pub. No. 2006/0190241 to Goutte, et al.). In these non-contiguous bi-phrases, one or both of the source phrase and target phrase is non-contiguous, i.e., has one or more gaps, each gap representing a word. For example, in a French to English translation system, one non-contiguous bi-phrase may be <ne ◊ plus, not ◊ ◊ ◊ anymore>, where each diamond symbol represents a gap of one word. In other systems, the gap symbol may represent a variable number of words with a weighting system which favors particular gap sizes.

While non-contiguous bi-phrases have some advantages over contiguous ones, in particular the ability to generalize better over such linguistic patterns as in French, "ne . . . pas" or in English, "switch . . . off", they may also lead to larger, more combinatorial, libraries. While the potential number of contiguous phrases in a sentence grows quadratically according to the length of the sentence, the potential number of non-contiguous phrases grows exponentially. It is desirable to control the proliferation of bi-phrases in this situation for several reasons. First, for storage purposes, the size of the bi-phrase library should not be too large. Second, it allows an improvement in translation speed by reducing the number of candidates to be considered during decoding. This is particularly relevant for a non-contiguous decoder, which is more complex than a contiguous one. Third, it helps to improve translation performance by removing "spurious" bi-phrases which do not have good predictive linguistic value.

In the case of a system based on contiguous bi-phrases, it has been shown that pruning of bi-phrases out of the library can be achieved without negatively impacting the end results, while at the same time improving the speed of decoding. (see, for example, Johnson, et al., *Improving translation quality by discarding most of the phrasetable*, Proc. 2007 Joint Conf. on Empirical Methods in Natural Language Processing and Computational Natural Language Learning (EMNLP-CoNLL), pp. 967-975 (2007), hereinafter "Johnson 2007"). In Johnson's approach, the strength of the statistical dependence between the source and the target of the bi-phrase is assessed. Those bi-phrases for which this strength is below a certain threshold can then be pruned from the library.

In existing techniques, filtering may begin with a computation of association scores between source- and target-phrases, based on the p-value associated to a certain statistical independence test, known as the "Fisher Exact Test." This test assumes that any bi-phrase extracted from a parallel corpus of bi-sentences can be represented by a contingency table, as illustrated in FIG. 1 for the bi-phrase (S,T). In this figure, N is the total number of bi-sentences in a parallel corpus, C(S) is the number of bi-sentences where the phrase S appears on the source side, C(T) is the number of bi-sentences where the phrase T appears on the target side, and C(S,T) is the number of bi-sentences where S and T both appear, on the source and target sides, respectively. C(S) and C(T) are also called marginals, and the four main entries in the contingency table C(S,T), C(S)−C(S,T), C(T)−C(S,T), and N−C(S)−C(T)+C(S,T) represent a partition of the N corpus bi-sentences into bi-sentences that contain both S and T, contain S but not T, contain T but not S, and contain neither S nor T. For example, suppose a parallel corpus includes 10,000 bisentences, of which C(S) is 100, C(T) is 120, and C(S,T) is 50, then the contingency table can be represented as follows:

| | | |
|---|---|---|
| C(S, T) = 50 | C(S) − C(S, T) = 50 | C(S) = 100 |
| C(T) − C(S, T) = 70 | N − C(S) − C(T) + C(S, T) = 9830 | N − C(S) = 9900 |
| C(T) = 120 | N − C(T) = 9880 | N = 10,000 |

Fisher's Exact Test is a statistical test for association in a table based on the exact hypergeometric distribution of the frequencies within the table. The test computes the probability ("p-value") that a certain joint event, here the joint occurrence of S and T in the source and target side of the same bi-sentence (S,T) appears under a so-called "null hypothesis" that corresponds to the situation where S and T are actually statistically independent. For the example above, for S and T, the null hypothesis is that if the C(S) occurrences of S are placed independently at random in the corpus and similarly for the occurrences of T, then: what is the probability that the joint occurrences of (S,T) will appear C(S,T) times or more? This probability is called the p-value.

Fisher's Exact Test computes the p-value exactly, using the following formulas:

$$p_{hypergeometric}(k) = \frac{\binom{C(S)}{k}\binom{N-C(S)}{C(T)-k}}{\binom{N}{C(T)}}$$

$$p\text{-value}(C(S,T)) = \sum_{k=C(S,T)}^{min(C(S),C(T))} p_{hypergeometric}(k)$$

where k is a variable which can assume integer values from k=C(S,T) to min(C(S), C(T)). The p-value is thus a measure which is associated with the contingency table defined by the quadruple [C(S,T), C(S), C(T), N], (or, equivalently, the quadruple [C(S,T), C(S)−C(S,T), C(T)−C(S,T), N−C(S)−C(T)+

C(S,T)]). The smaller the p-value, the more significant the "dependence" between S and T is considered to be. For example, when the p-value is close to 0, then it means that the probability of finding as many joint occurrences as C(S,T), given that the marginals are C(S) and C(T), and given that the occurrences of S and of T are placed at random among the N bi-sentences, is close to 0. An association-score relative to a contingency table may be defined as follows:

association_score=−log(p-value)

where log may be $log_e$.

Thus, for example, in the contingency table above, according to Fisher's exact test in R, the matrix data is input as follows:

data<−c(50,50,70,9830)

To create the matrix in R, enter:

mat<−matrix(data,nrow=2,ncol=2,byrow=TRUE)

To calculate the p-value in R enter:

ftest=fisher.test(mat,alternative="two.sided")

The algorithm outputs:

p-value=4.502836e−73 association score=−log(p-value)=166.584

The association score, which will be referred to herein as β, varies between a minimum and a maximum value (e.g., from 0 to ∞, or some value less than ∞), with high numbers indicating a strong statistical dependence. Pruning of bi-sentences can be used to remove bi-sentences below a certain threshold value of β.

While Fisher's Exact Test provides an exact measure of the p-value, another statistical test of independence is the $\chi^2$. However, while more computationally costly, the exact test is more accurate than the $\chi^2$ when the counts in the cells of the contingency table are small, which is typically the case for bi-phrase tables.

One problem with using the association score for determining whether to prune a bi-sentence or bi-phrase from a library is that a high nominal association score between S and T does not always indicate dependence. This can be shown by the following example:

A corpus contains N=500,000 bi-sentences. Call a word S (resp. T) a singleton if it is represented only once in the source (resp. target) side of the corpus. Assume that 17,379 source singletons and 22,512 target singletons are observed and 19,312 s-s (singleton-singleton) pairs are observed. Each s-s pair has the same contingency table, and hence the same high association score: −log(p-value)=−log(1/500,000). However, if these singletons were placed independently at random among the 500,000 bi-sentences, on the source and target sides resp., (null hypothesis), it would be expected that around 782.5 (=17,379×22,512/500,000) s-s pairs would be observed.

This means that if around 782 s-s pairs had been observed (rather than 19,312), there would be no confidence that any such pair (S,T) would actually be indicative of a statistical dependence between S and T, despite the high association score of −log(1/500,000).

This indicates a difficulty in interpreting such statistical significance tests. For any given singleton-singleton pair it is true that the probability of it occurring by chance, if the two singletons are actually statistically independent, is 1/500,000. However, it would be wrong to conclude from this that the fraction of the global population of singleton-singleton pairs that were observed (namely 19,312) that is due to chance is only 1/500,000. This would be the case if s-s pairs were statistically independent from one another, but clearly they are not, and the fraction of unreliable s-s associations is in general much larger.

To remedy this problem, the notion of noise has been introduced (see Robert C. Moore, *On log-likelihood-ratios and the significance of rare events*, Proceedings of EMNLP 2004 (Barcelona, Spain) (Dekang Lin and Dekai Wu, Eds.), Association for Computational Linguistics, July 2004, pp. 333-340) (hereinafter, "Moore 2004"). Noise is defined by Moore as the ratio between the expected number of s-s pairs under an independence assumption and the actually observed number of s-s pairs.

In the above example:

Noise=782.5/19,312=4%.

If only around 782 s-s pairs had been observed, the Noise would be close to 100%. However, given that 19,312 such pairs were observed, it can be concluded that there is about 0.04 probability that a given s-s pair is due to chance. If instead, the raw association score were used to estimate this probability, the p-value would be 1/500,000=0.000002, that is, a much too optimistic estimate of the dependence.

Attempts have been made to extend the concept of noise beyond singletons to words which can occur more than once in the corpus. However, on real bilingual corpora, it is typically the case that noise decreases monotically with the association score. Specifically, noise increases as association decreases and vice versa. As a result, attempts to use noise thresholds as a basis for pruning bi-phrases from a library are no different from approaches which are based on the association scores.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Goutte, et al.; U.S. Pub. No. 2007/0150257, published Jun. 28, 2007, entitled MACHINE TRANSLATION USING NON-CONTIGUOUS FRAGMENTS OF TEXT, by Cancedda, et al.; U.S. Pub. No. 2007/0265825, published Nov. 15, 2007, entitled MACHINE TRANSLATION USING ELASTIC CHUNKS, by Nicola Cancedda, et al.; and U.S. application Ser. No. 12/404,412, filed on Mar. 16, 2009, entitled METHOD TO PRESERVE THE PLACE OF PARENTHESES AND TAGS IN STATISTICAL MACHINE TRANSLATION SYSTEMS, by Jean-Baptiste Faddoul, et al.

Methods for building libraries of parallel corpora from which bilingual dictionaries can be generated are disclosed, for example, in U.S. application Ser. No. 11/789,089, filed Apr. 20, 2007, entitled METHOD FOR BUILDING PARALLEL CORPORA, by Francois Pacull.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. application Ser. No. 11/969,314, filed on Jan. 4, 2008, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, a method for pruning a library of bi-phrases includes partitioning a bi-phrase library into a set of sub-libraries. For each of at least a plurality of the sub-libraries and for each of a plurality of association score thresholds, values of noise are computing as a function of expected counts and observed counts, where observed counts corresponds to a number of bi-phrases in the sub-library having an association score above the association score threshold, and expected counts corresponds to a number of bi-phrases in the sub-library having an association score above the association score threshold under an independence hypothesis. The plurality of sub-libraries are pruned, based on a common noise threshold, including, for each sub-library, determining an association score pruning threshold corresponding to the common noise threshold, and pruning bi-phrases from the sub-library having an association score which exceeds the association score pruning threshold.

In accordance with another aspect of the exemplary embodiment, an apparatus for pruning bi-phrases includes memory which stores: a set of sub-libraries formed by partitioning a bi-phrase library, corpus statistics for a corpus of bi-sentences from which the bi-phrase library is generated, including association scores for bi-phrases in the bi-phrase library, and corpus statistics for a virtual corpus including association scores for bi-phrases in the virtual corpus, the virtual corpus being generated by randomizing the bi-sentences in the corpus of bi-sentences. A bi-phrase filtering system prunes bi-phrases from the sub-libraries based on an application of a common noise threshold, where for each sub-library, noise is a function of expected counts and observed counts for a given threshold association score, the observed counts being computed for bi-phrases in the sub-library and the expected counts being computed for the same bi-phrases in the virtual corpus.

In accordance with another aspect of the exemplary embodiment, a method for pruning a library of bi-phrases includes partitioning a bi-phrase library into a set of sub-libraries of different complexity and pruning bi-phrases from the plurality of sub-libraries based on a common noise threshold, whereby a complexity of bi-phrases is taken into account in pruning the bi-phrases.

DETAILED DESCRIPTION

Figure 1:
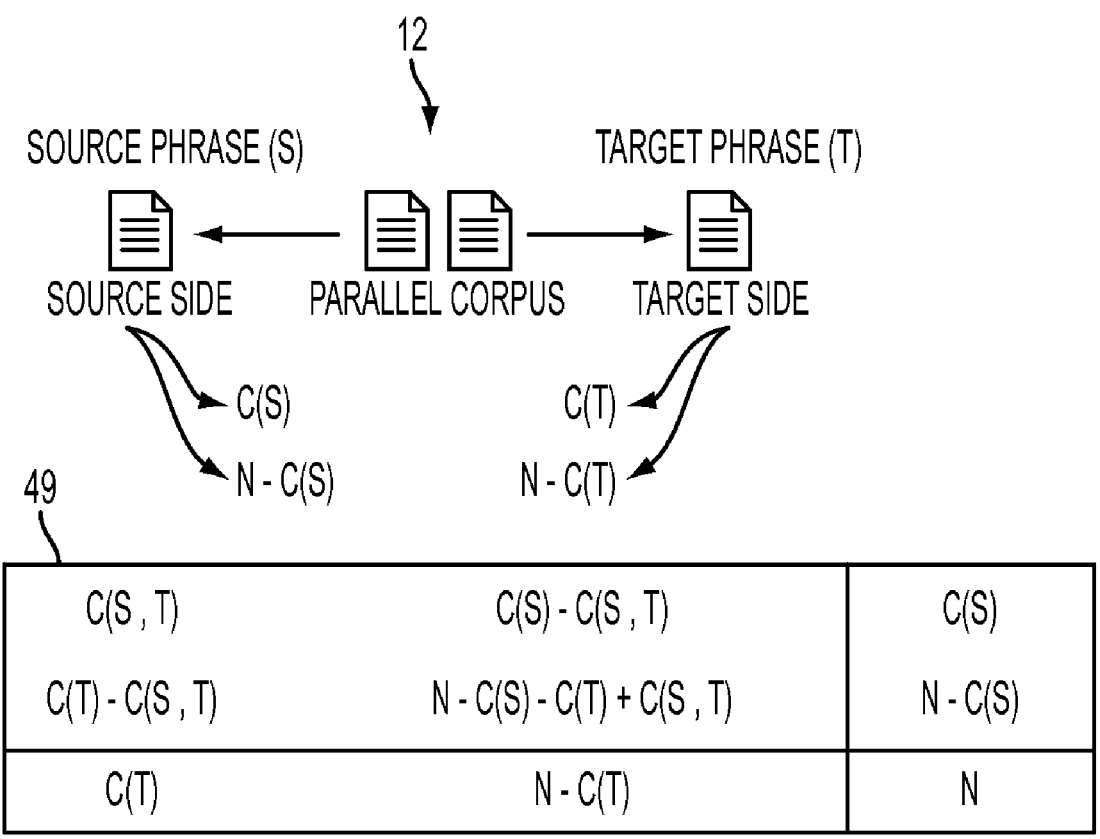
FIG. 1 illustrates a contingency table for a bi-phrase extracted from a parallel corpus.

The exemplary embodiment provides an apparatus and computer-implemented method for pruning (filtering out) bi-phrases from a bilingual library of bi-phrases developed for use by a machine translation system. The exemplary method prunes the bi-phrases in a way which reduces the impact on the quality of translation and may, in some circumstances, improve it. The pruned bi-phrase library can be incorporated into a machine translation system which can then be used for translating between two natural languages, i.e., from a source language to a target language, with the aid of the bilingual library.

A "phrase," as used herein generally refers to one or more words in either the source or target language. A phrase can be contiguous or non-contiguous (i.e., include a gap of one or more unspecified words between two words of the phrase).

A "bi-phrase," as used herein, generally comprises a source phrase in the source language and a target phrase in the target language, which is a translation of the source phrase or, more specifically, is predicted to be a translation by a computer system designed to extract bi-phrases from parallel corpora. The source and target phrases are associated in word-aligned corpora, referred to herein as a bi-phrase library, stored in memory, whereby a target phrase corresponding to an input source phrase may be retrieved. It will be appreciated that a phrase in one language may appear in more than one bi-phrase, where multiple translations exist.

In the following (S,T) represents a bi-phrase comprising a source phrase S and corresponding target phrase T. The source phrase is extracted from a source sentence and the target phrase is extracted from a translation of the source sentence. The source and target sentences generally form a part of a large parallel corpus of aligned sentences.

A "cept," as used herein, is an elementary bi-phrase from which more complex bi-phrases can be built. For example, the two cepts <drank; a bu> and <wine; du vin> could be combined into the "two-cept bi-phrase" <drank wine; a bu du vin>.)

The exemplary apparatus and method, in some embodiments, take into account the following considerations.

First, rather than directly using the p-value measure to assess the statistical dependence between the source-phrase and the target-phrase, based on the corpus statistics associated with this individual bi-phrase, a noise level measure is used, which takes into account this pair in the context of all other bi-phrases. This is better statistically motivated in the context of large bi-phrase libraries, as is the case in statistical machine translation (SMT).

Second, when computing the noise level, a complexity of the bi-phrase is taken into consideration. The complexity may roughly correspond to the size of the bi-phrase. It is shown experimentally that by filtering on the basis of this complexity-informed noise, the end-results of an SMT system can be improved, relative to existing methods.

Finally, a simulation-based approach is introduced for computing the noise level. In this approach, the statistics observed in the corpus are directly compared with statistics obtained by simulating a virtual "randomized" corpus that has similar statistics to the observed corpus, but in which the translation correlations between source and target sentences have been neutralized through permutation. This approach is simpler than previously described techniques and is also more general, for it can be used to compute different variants of the "null hypothesis" used for assessing the significance of the bi-phrases in the library.

Figure 2:
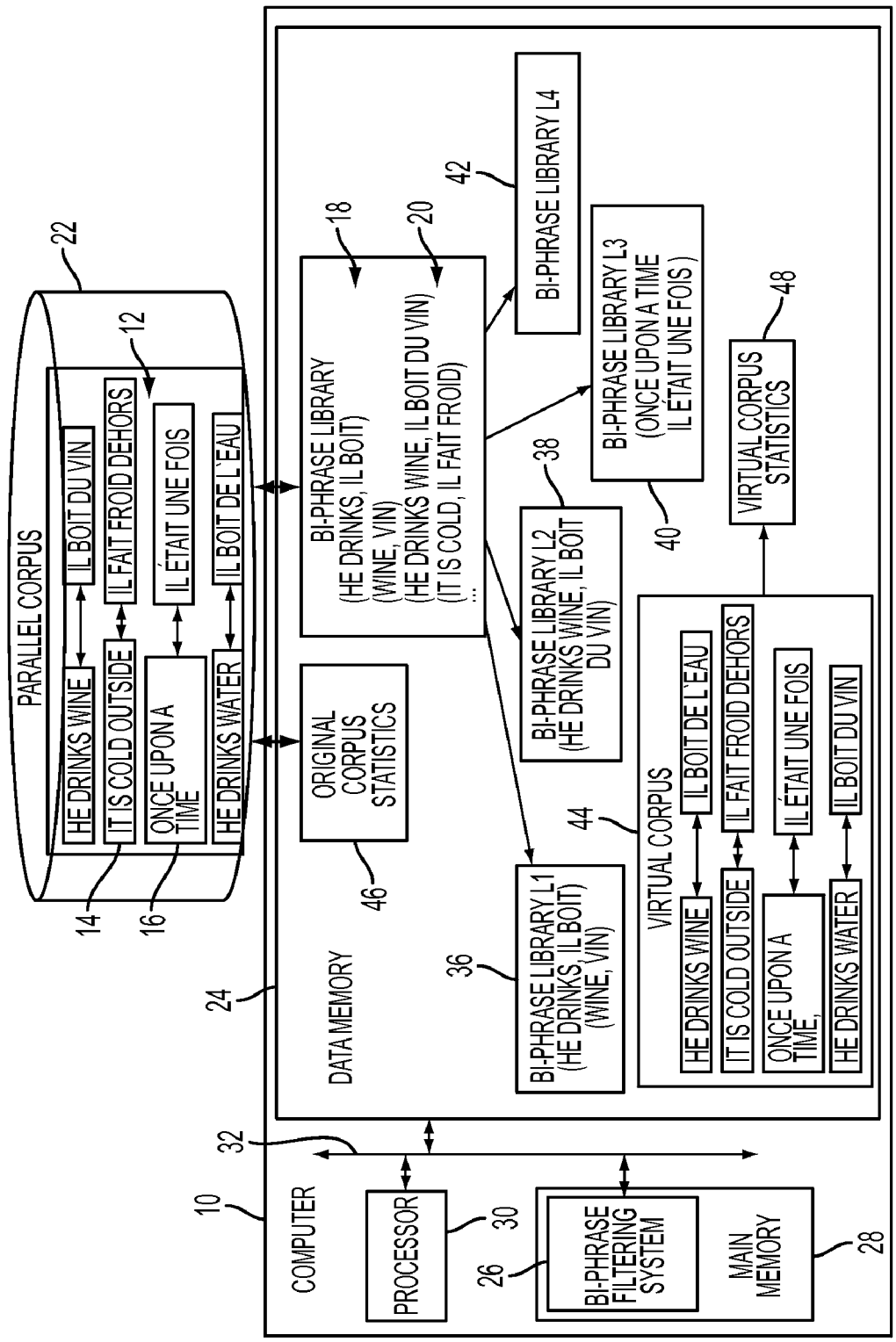
FIG. 2 illustrates an exemplary apparatus for filtering bi-phrases from a bi-phrase library in accordance with one aspect of the exemplary embodiment.

With reference to FIG. 2, an exemplary apparatus 10 for filtering bi-phrases is shown. The apparatus may take the form of a general purpose computing device or a dedicated computing device. The apparatus has access to a parallel corpus 12 of aligned sentences 14, 16, etc. from which a library 18 of bi-phrases 20 has been extracted and which is to be pruned. The corpus 12 and library 18 are stored in computer readable data memory 22, 24 which may be resident in the apparatus 10 or in a separate memory storage device communicatively linked to the apparatus.

The apparatus 10 includes a bi-phrase filtering system 26, which may be in the form of hardware or software. The exemplary bi-phrase filtering system 26 is a software application which includes instructions for performing the exemplary method described below with reference to FIG. 3. The bi-phrase filtering system 26 may be stored in memory, such as main memory 28 of the apparatus 10. A processor 30, such as a CPU, communicatively linked to main memory 28, executes the instructions to implement the filtering system. The components 22, 28, 30 may be linked by a data\control bus 32. It will be appreciated that computing device 10 may be controlled by operating system software which includes a file management system, such as, for example, a disk operating system, which is part of the operating system software, and which may be stored in main memory 28.

The apparatus 10 may be any computing device, such as a desktop, a laptop, palmtop computer, portable digital assistant (PDA), a server computer, combinations thereof, or the like. The memories 22, 24, 28 may represent any type of computer readable medium such as random access memory (RAM), read only memory (ROM), magnetic disk or tape, optical disk, flash memory, or holographic memory. In one embodiment, the memories may comprise a combination of random access memory and read only memory. In some embodiments, the processor 30 and memory 28 may be combined in a single chip.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

During the course of the exemplary method, the bi-phrase library 18 is transformed, by pruning some of its bi-phrases, from one which includes a large number of bi-phrases, such as 200,000 or more, to one which may include 80% or less of the original number of bi-phrases, such as around 100,000-150,000 bi-phrases. Additionally, during the method, a plurality of sub-libraries 36, 38, 40, 42 (four in the exemplary embodiment) are generated from the bi-phrase library 18, which may be stored in memory, such as memory 24. A virtual parallel corpus 44 may also be generated from corpus 12 and stored in computer readable memory, such as memory 24. The virtual corpus, like the original corpus, includes bi-sentences in source and target languages, however, the majority of the bi-sentences in virtual corpus 44 are not mutual translations of each other, as will be explained in further detail below. The original corpus 12, which may be extracted from a large number of parallel documents (mutual translations) is associated with corpus statistics 46. Analogous corpus statistics 48 are generated for the virtual corpus.

The apparatus 10 and its components are best understood with reference to the exemplary method, and thus will not be described in detail here.

In the present apparatus and method, a bi-phrase (S,T) 20 will be pruned from the library 18 if its Noise(S,T), is larger than a pruning threshold γ The pruning threshold γ can be tuned on a validation set in order to optimize or balance such criteria as translation performance and library size. As discussed above, Noise(S,T)=Noise(β), with β=association-score(S,T)

Noise (S,T) is computed as $$\frac{\text{expected }(\beta)}{\text{observed }(\beta)},$$

where the expected (β) is determined from the virtual corpus 44, as described in further detail below. This measure, which takes into account this pair in the context of all other bi-phrases, is better statistically motivated in the context of large bi-phrase libraries.

The association_score β is taken as −log(p-value) which may be computed using Fisher's exact test for determining the p-value from the contingency table, as noted above. In the present case, the contingency table 49 represents phrases S and T, rather than words, and can be represented as before:

| C(S, T) | C(S) − C(S, T) | C(S) |
|---|---|---|
| C(T) − C(S, T) | N − C(S) − C(T) + C(S, T) | N − C(S) |
| C(T) | N − C(T) | N |

In the present case the four main entries in the contingency table 49, i.e., C(S,T), C(S)−C(S,T), C(T)−C(S,T), and N−C(S)−C(T)+C(S,T) represent a partition of the N corpus bi-sentences into bi-sentences that contain both S and T, contain S but not T, contain T but not S, and contain neither S nor T.

Contingency tables 49 are thus generated for each bi-phrase in the original corpus 12 and also for the same bi-phrases, to the extent that they occur, in the virtual corpus of bi-sentences 44, generated from the original corpus. The contingency tables are used to compute p-values and hence association scores. Various software products are available for computing one or both these parameters automatically. For example, where the p-value is computed, the efficient R implementation of Fisher's exact test is used. R is an open source statistical package with versions available for Linux, Mac OS X, and Windows.

The exemplary embodiment solves some of the problems which arise with prior methods. In directly transposing Moore's noise computations from words to phrases, the prior methods do not account for the fact that phrases may vary considerably in complexity, from one single word to several words, and in some instances, the complexity of non-contiguous phrases, from phrases with no gaps to phrases with multiple gaps. This can be illustrated by comparing the two following cases:

For a certain single-word phrase S1 and a certain single-word phrase T1, it is the case in the actual corpus that S1 appears once, T1 appears once, and they happen to occur in the same bi-sentence.

For a certain multi-word, multi-gap, phrase S2 and a certain multi-word, multi-gap, phrase T2, it is the case in the actual corpus that S2 appears once, T2 appears once, and they happen to occur in the same bi-sentence.

The two bi-phrases (S1,T1) and (S2,T2) have the same contingency table (1,0,0,N−1), and therefore the same association score. However, while there is some evidence that S1 and T1 may have some translational relation, the evidence in the case of (S2,T2) is much weaker. This is because there are so many ways to produce phrases S2' and T2' of similar complexity to S2 and T2 that when S2' and T2' are observed in the same bi-sentence, it will often be the case that the associated contingency table will be (1,0,0,N−1). This is not the case when considering phrases S1' and T1' of similar complexity to S1 and T1 (namely, single-word phrases). If S1' and T1' are observed in the same bi-sentence, then it will rarely be the case that their contingency table will be (1,0,0, N−1). It is more likely that the words S1' and T1' will appear many times in the corpus, either together or not (and more probably not if they are not in fact related).

Thus, while the association scores for (S1,T1) and (S2,T2) are exactly the same, it would be inappropriate to imply that this provides the same evidence as to their statistical dependence. However, in existing approaches, either both would be pruned from the library, or neither one of them.

The exemplary method takes the bi-phrase complexity into account. Rather than computing Noise(β) uniformly for all possible bi-phrases, the bi-phrases are partitioned into several complexity classes (each constituting a sub-library 26, 38, 40, 42), and for each complexity class, Noise(β) is computed.

FIG. 2 illustrates an exemplary method for bi-phrase filtering in accordance with the exemplary embodiment. The method begins at S100. It is assumed that a library 18 of bi-phrases has been generated from a large corpus 12 of parallel sentences (bi-sentences) in which each bi-phrase can be represented (S,T) and wherein one or both of S and T may include gaps, as discussed above.

At S102, corpus statistics 46, e.g., in the form of association scores, are generated for all or at least a set of the bi-phrases in the library 18, e.g., computed using Fisher's Exact method. As previously noted, the association score for each bi-phrase S,T is computed from the respective contingency table 49.

At S104, a certain number n of threshold levels for the association score β is selected. This is done for computational convenience in order to "discretize" the computation. In principle, any number of threshold levels can be computed, depending on the granularity of the pruning decisions that is desired. The thresholds will be referred to as $\beta_i = \beta_1, \beta_2, \beta_3, \beta_4, \ldots, \beta_n$ where $\beta_1 < \beta_2 < \beta_3 < \beta_4 \ldots < \beta_n$. For example, there may be at least 3 threshold levels (n=3) or at least 4 threshold levels (n=4), and in one embodiment, up to about 50 threshold levels (n=50) or more. These association score threshold levels may be selected manually or automatically and stored in memory 24. For example, the range of possible association scores is roughly divided into equally spaced intervals, so that $\beta_1 = x$, $\beta_2 = \beta_1 + x$, $\beta_3 = \beta_2 + x$, $\beta_4 = \beta_3 + x$, etc.

At S106, the global bi-phrase library 18 is automatically partitioned into a plurality of sub-libraries 36, 38, 40, 42. The sub-libraries differ with respect to the complexity of the bi-phrases within them, with each bi-phrase being assigned to only one of the libraries. For example, every bi-phrase in the global library 18 is assigned to an appropriate one of the sub-libraries and if a sub-library is empty because no bi-phrase fits in the complexity category, the library is considered not to exist. The sub-libraries 36, 38, 40, 42 may be arranged, for convenience, in order of increasing complexity. For example, at least three sub-libraries are generated and in one embodiment, four (or more) sub-libraries may be generated which for convenience are referred to as L1, L2, L3, L4, etc. in order of increasing complexity: L4 more complex than L3, which is more complex than L2, which is more complex than L1. In particular, the sub-libraries are constructed such that there is no overlap in the content of sub-libraries, i.e., each bi-phrase is able to be assigned to only a single one of the sub-libraries. As will be appreciated, the number of sub-libraries is not limited to 3 or 4, for example, the number of sub-libraries can range from 2 to 100, and is conveniently up to about 10.

In one embodiment, the bi-phrases in sub-libraries L1-L4 may be composed of 1 cept, 2 cepts, 3 cepts, and 4 cepts, respectively. Thus, for example, the 1-cept bi-phrases (assuming they are present in the corpus) <drank; a bu> and <wine; du vin> are assigned to sub-library L1 while the two-cept bi-phrase <drank wine; a bu du vin> (assuming it is present in the corpus) is assigned to sub-library L2. As will be appreciated, other methods may be established for assigning bi-phrases based on complexity. For example, where the SMT system is designed to utilize non-contiguous as well as contiguous bi-phrases, 1 cept bi-phrases without gaps such as <wine; du vin> are assigned to sub-library L1, 1 cept bi-phrases with gaps such as <never; ne ◊ jamais> where ◊ represents a gap of one word, are assigned to sub-library L2, and so forth. In other embodiments, the complexity can be based on a number of words. Thus, for example, bi-phrases with a word total of two (one source word and one target word) are assigned to sub-library L1, bi-phrases with a total of three words and no gaps to sub-library L2, bi-phrases with a total of three words and a gap on either the source or target side to sub-library L3, and so forth. Of course, the number of sub-libraries can be reduced by combining two or more of these groups. For example, one sub-library could contain bi-phrases of from two to four words in total and another from five to six words in total, and so forth.

At S108, for each sub-library, its bi-phrases are partitioned into their source phrases and target phrases, obtaining a bag of source phrases S and a bag of target phrases T. For instance, the bi-phrase <ne ◊ plus; not ◊ ◊ ◊ anymore> is projected into the source phrase <ne ◊ plus> and into the target phrase <not ◊ ◊ ◊ anymore>. This allows computation of C(S), C(T) and C(S,T), for such S's and T's, to obtain the contingency tables on which the association scores are based (if this has not already been done in generating corpus statistics).

At S110, for each sub-library and for each threshold $\beta_i$, the number of bi-phrases formed from elements of S and T in the sub-library that have an association score equal to or larger than threshold $\beta_i$ is computed. These counts are based on the original bilingual corpus 12 (corpus statistics generated at S102) and are called the observed counts.

At S112, a virtual corpus 44 of bi-sentences is created. The virtual corpus can be obtained from the original corpus 12 through a randomized simulation that effectively neutralizes the translation dependencies present in the original corpus without changing the number of each stored phrase on the source and target sides. This simulation process is described in more detail below. Corpus statistics (association scores) 48 can be computed for the bi-phrases in the virtual corpus in the same way as for the original corpus.

At S114, the expected counts, under an independence hypothesis, are determined for each threshold $\beta_i$. The expected count is the number of bi-phrases formed from elements of S and T in the sub-library in question that have an association score equal to or larger than threshold $\beta_i$ under the independence hypothesis. Here rather than using the bilingual corpus 12, the counts are based on the virtual corpus statistics 48.

At S116 noise($\beta$) is computed for each of the thresholds $\beta_i$ for each sub-library as the ratio between expected counts and observed counts.

$$\text{Noise}(S, T) = \text{noise}(\beta) = \frac{\text{expected}(\beta)}{\text{observed}(\beta)}$$

The result of step S116 is a set of plots (curves) relating the noise level to the association score, one for each complexity class (which in the exemplary embodiment, correspond to 1 cept, 2 cepts, 3 cepts, and 4 cepts, i.e., four plots).

At S118, a noise threshold $\gamma$ is selected above which a bi-phrase will be pruned. The same noise threshold $\gamma$ is applied to each sub-library L1, L2, L3, L4. However, the corresponding association score pruning threshold for each sub-library is different. Thus, when computing the noise curves separately on sub-libraries of different complexities, a single noise threshold corresponds to different association score pruning thresholds for the different sub-libraries. In the exemplary embodiment, the association score pruning thresholds corresponding to $\gamma$ may be designated $\beta_{L1}$, $\beta_{L2}$, $\beta_{L3}$, $\beta_{L4}$, for sub-libraries L1, L2, L3, and L4, respectively. Typically, where libraries are of increasing complexity from L1 to L4, the association scores corresponding to $\gamma$ increase, i.e., $\beta_{L1} < \beta_{L2} < \beta_{L3} < \beta_{L4}$. Thus, as bi-phrase complexity increases, the likelihood that any bi-phrase with a given association score will be pruned, decreases.

At S120, bi-phrases are pruned based on the association score pruning threshold for the library in which they are located. Thus, for library L1, bi-phrases which have an association score which is less than $\beta_{L1}$ are pruned, and so forth.

The method ends at S122. As will be appreciated, the steps of the exemplary method need not all follow in the order illustrated. Additionally, if new sentences are added to the corpus 12 and/or new bi-phrases 20 added to the library 18, the method can be repeated in whole or in part.

Figure 4:
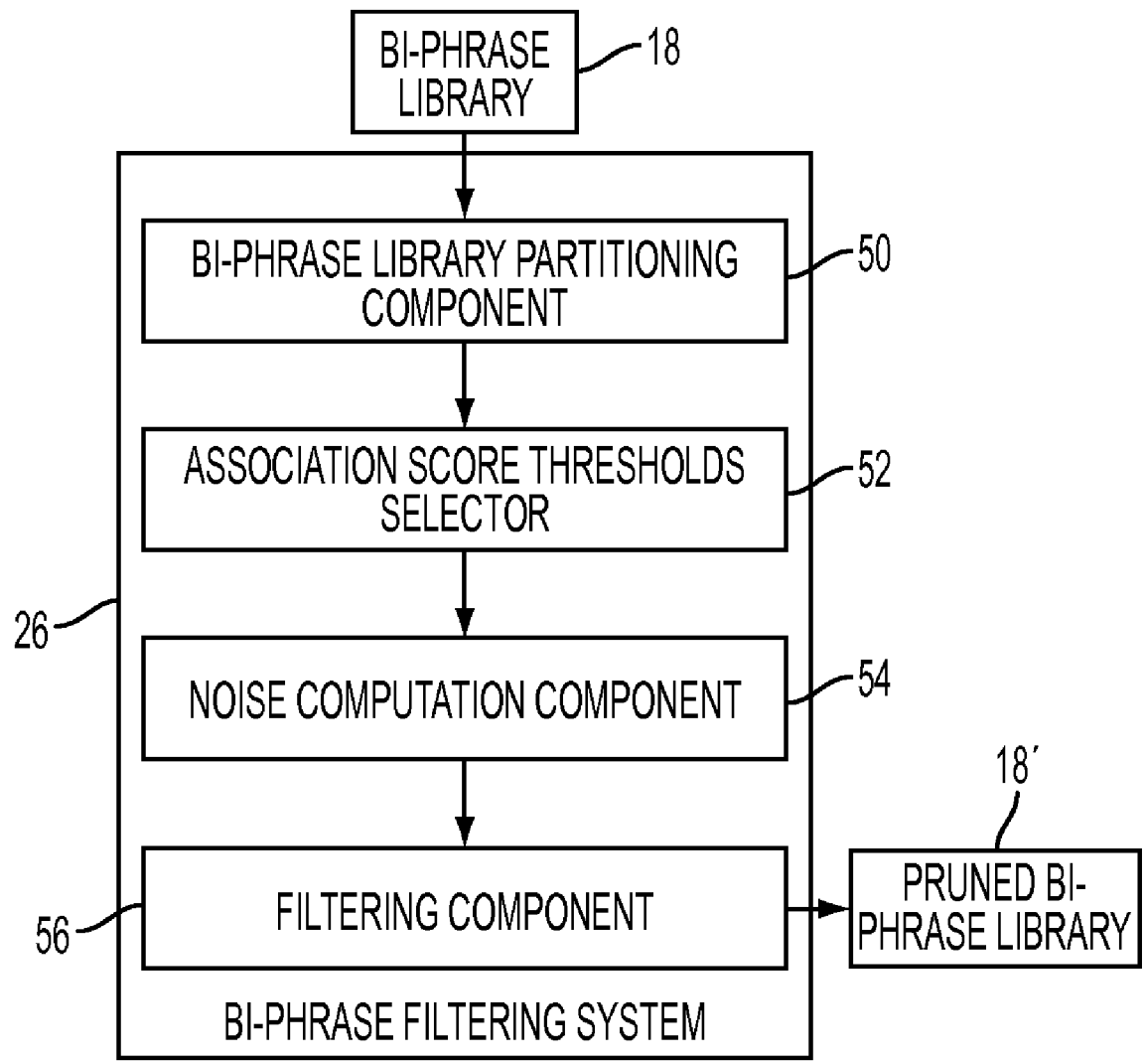
FIG. 4 is a functional block diagram which illustrates components of the exemplary bi-phrase filtering system in accordance with one aspect of the exemplary embodiment.

The bi-phrase filtering system 26 shown in FIG. 1 may include various components for performing the exemplary method, as illustrated in FIG. 4, including a bi-phrase library partitioning component 50, for partitioning the library 18 into sub-libraries 36, 38, 40, 42, an (optional) association score thresholds selector 52, which selects a set of association score thresholds, a noise computation component 54 which computes the observed and expected counts for each sub-library for each association score threshold computes noise therefrom, and generates a noise plot for each sub-library, and a filtering component 58 which applies the same predetermined noise threshold $\gamma$ to each plot and filters bi-phrases from the respective sub-library based on the association score pruning threshold corresponding to the predetermined noise threshold. The filtering component 58 may apply different noise thresholds, e.g., in an iterative process to identify an optimum noise threshold with reduces the bi-phrase library to a predetermined size of about 100,000 bi-phrases. The output is a smaller bi-phrase library 18'. The generation of corpus statistics 46, 48 for the original and virtual corpus may be performed by the bi-phrase filtering system 26 or by a separate component. Components 50, 52, 54, and 56 may all be software components stored in memory 26 and implemented by processor 30.

Figure 5:
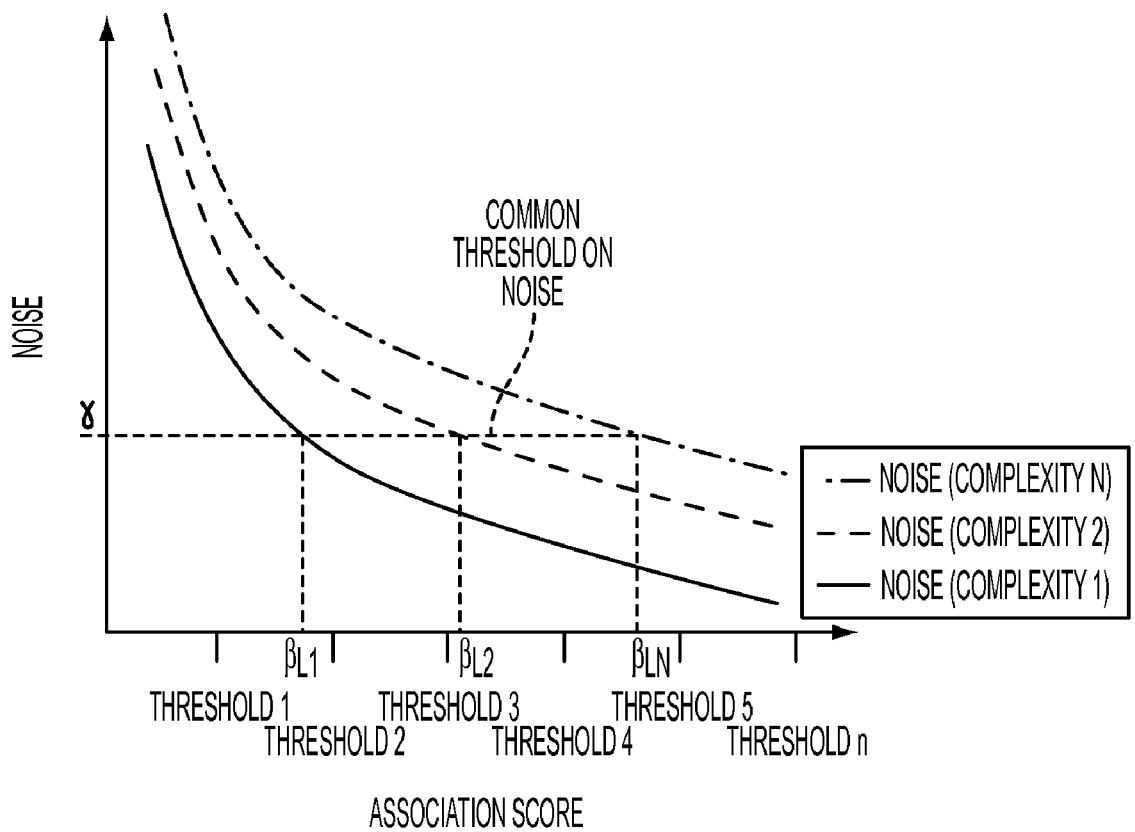
FIG. 5 illustrates exemplary noise plots in which noise is plotted against association score for a set of bi-phrase libraries of different complexity levels.

FIG. 5 illustrates exemplary noise plots in which noise is plotted against association score, with association score thresholds 1, 2, 3, 4, . . . n. corresponding to $\beta_1$, $\beta_2$, $\beta_3$, $\beta_4$, . . . $\beta_n$, etc. Noise complexity 1 corresponds, for example, to sub-library L1, Noise complexity 2, to sub-library L2, etc. (Here for convenience only the results for three sub-libraries L1, L2, and Ln are illustrated). It can be seen that if a common threshold $\gamma$ on the Noise level is selected across the several complexity classes, this corresponds to a different association score pruning threshold for each complexity class. Thus, rather than pruning the bi-phrases based on a given association score, they are pruned based on a common noise level, which results in a different association score being applied to each sub-library.

Simulating a Corpus Under Some Independence Hypothesis

In the exemplary embodiment, for computing the expected counts, a virtual corpus 44 is created (S112). It is then possible to estimate the bi-phrase "expected counts" by simply observing bi-phrase counts in this virtual corpus. While the expected counts thus obtained are intended to simulate the results which would be obtained under an independence hypothesis, the expected counts computed by this method may differ slightly from what may actually be expected under a true independence hypothesis. However, the simulated corpus is simple to generate and, provided the original corpus has a relatively large number of bi-sentences, gives good results. It also avoids the need to generate many simulated corpora and average the results. In practice, with a large enough original corpus, the difference between using such an averaging process and only using one simulation is negligible. It also provides much flexibility as to the exact nature of the "null hypothesis" providing the baseline for the independence test between source and target phrases. For example, in generating the virtual corpus 44, in one embodiment, it may be decided to keep the word-level statistics in the corpus invariant (that is, maintaining the counts of each source or target word invariant) while randomly permuting the source words across the source sentences and similarly for the target words.

In the exemplary embodiment, however, a virtual corpus 44 is created by keeping the sets of source sentences and target sentences identical to those of the original corpus 12. However the positions of the target sentences are randomly permuted relative to those of the source sentences, thereby destroying the translation relation between the source and the target sentences. If (S,T) is a pair composed of a source-phrase S and a target-phrase T, then the observed count of (S,T) in the simulated corpus 44 is computed as the number of times that pair appears in some bi-sentence of the simulated corpus. This procedure has the advantage that the source phrases S and the target phrases T that were listed in the bi-phrase library for the original corpus keep the marginal counts that they had in the original corpus, which would not be the case with transformations reaching inside the source or target sentences. In addition, this procedure preserves the statistical dependencies between phrases in a same language. An example of such dependencies comes from those cases when a phrase S (and similarly for T) is a complex phrase: a sentence containing S will also necessarily contain all sub-phrases S' of S. It would not be correct to assume that occurrences of S and S' can be placed independently, and the exemplary method retains their dependence.

While it is contemplated that a method for generating estimated counts could alternatively be based on the method proposed by Moore, the dependency between sub-phrases and phrases provided by the exemplary method would be lost. This is not a problem for Moore, where only single words rather than multi-word phrases are considered. For single words, randomly placing words in different sentences ignoring statistical dependencies between words of the same language is a less severe simplification. In the case of phrases as opposed to words, if the phrases were placed randomly among the corpus sentences independently of each other, this would significantly modify the statistical properties of the source (resp. target) sentences. By taking the current approach, these statistical properties are unchanged, and the virtual corpus concentrates on variations due only to the randomization of target sentences relative to source sentences.

The exemplary method is extremely flexible. Once the simulated corpus 44 has been created, the bi-phrase library could be completely rebuilt starting from that corpus. The statistics obtained on those bi-phrases could then be used for computing the noise of the original corpus relative to the simulated corpus 44.

It is to be appreciated that there may be instances in the present method where estimated counts generated by the method of Moore may be adequate or more readily computed. In adapting Moore's method, for given phrases (rather than words) S and T having marginal counts C(S) and C(T), the expected number of times S and T be would found in the same bi-sentence is computed assuming a certain independence hypothesis which is represented by the following generative model: for each of the C(S) occurrences of S, put the occurrence at random among the N bi-sentences of the corpus, and similarly for each of the C(T) occurrences of T. Under this simple generative model, it is possible to compute the expected number of times S and T are found in the same bi-sentence, namely C(S)*C(T)/N.

As will be appreciated, variants of the exemplary method for generating estimated counts are contemplated. For example, the method may include decomposing a complex bi-phrase made of some smaller bi-phrases into its component bi-phrases (for instance <paper jam; bourrage papier> can be decomposed into <paper; papier> and <jam; bourrage>), and randomly placing these components in different sentences. This would have the effect of allowing a comparison between the observed statistics of a complex bi-phrase and the expected statistics under random combination of its component bi-phrases, and could be used to prune those complex bi-phrases for which, because of their low frequency of occurrence, the computed association score could be unreliable.

Figure 3:
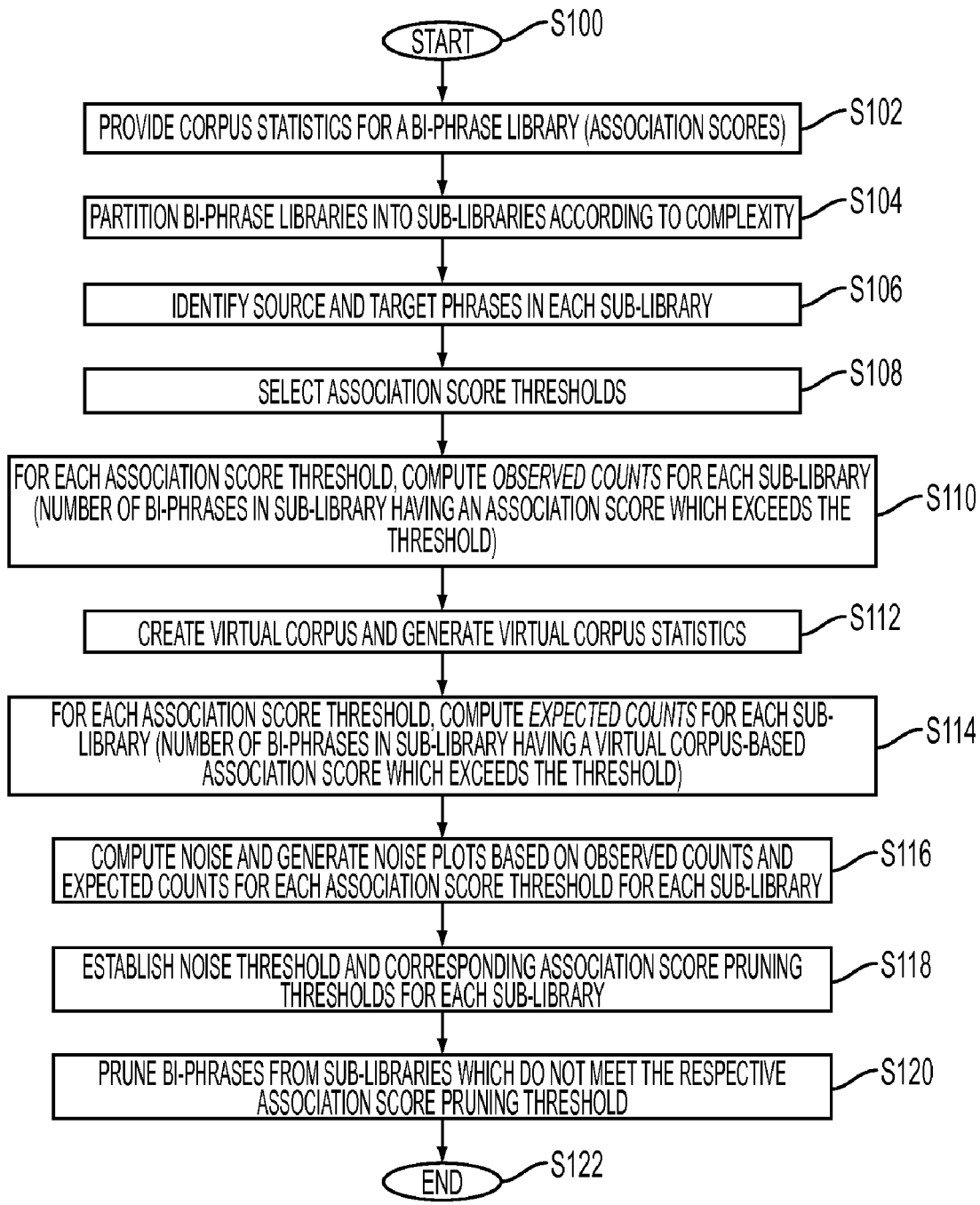
FIG. 3 illustrates an exemplary method for filtering bi-phrases from a bi-phrase library in accordance with another aspect of the exemplary embodiment.

The method illustrated in FIG. 3 may be implemented in a computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. Or the medium may be a transmittable carrier wave in which the control program is embodied as a data signal transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the method for pruning bi-phrases.

The exemplary pruned bi-phrase library 18' formed by the exemplary method can be used in a statistical machine translation system, for translating text between a first language and a second language, and optionally vice-versa. Exemplary translation systems are those described in above-mentioned U.S. Pub. Nos. 2008/0300857, 2006/0190241, 2007/0150257, and U.S. Pub. No. 2007/0265825 and application Ser. No. 12/404,412, incorporated herein by reference. In general, such a system is hosted by a computer and may operate by receiving a source text (e.g., a phrase, sentence, paragraph or entire document) for translation, and for each sentence, identifying, from the library, a set of bi-phrases which include phrases in the source text sentence. From these bi-phrases, an optimal subset of bi-phrases is identified, where each word of the source text is covered by only one source phrase. Such a system may be incorporated in the exemplary apparatus 10 or may be hosted by a separate computing device or devices.

Without intending to limit the scope of the exemplary embodiment, the following Examples demonstrates the application of the method and the results obtained, compared with a baseline comparative method.

EXAMPLES

For the following examples, a relatively small corpus with high lexical homogeneity was used as the corpus 12. This was obtained from French-English technical documents, yielding 50,000 sentence pairs 14, 16.

Example 1

Pruning Based on Association Score (Comparative Example)

As a baseline experiment, for comparative purposes, raw association scores were used for pruning of bi-phrases from a bi-phrase library extracted from the sentence pairs. In this approach, the method of Johnson 2007 was adapted to use with non-contiguous bi-phrases. The global bi-phrase library U generated from these sentence pairs was partitioned into a number of sub-libraries (another change from Johnson 2007). For the sub-libraries, $U^1$ was made of bi-phrases containing only one cept, with an arbitrary number of gaps, $U^2$-$g^0$ included bi-phrases containing 2 cepts, but with no gaps, $U^2$-$g^4$ included bi-phrases containing 2 cepts with at most 4 gaps, $U^3$-$g^4$ included bi-phrases with 3 cepts, again with at most 4 gaps, and $U^4$-$g^4$ included bi-phrases with 4 cepts, again with at most 4 gaps. As previously noted, a "cept" is an elementary bi-phrase from which more complex bi-phrases can be built. Also, in these examples, each gap represents one word, and is totaled over S and T. Table 1 shows the number of bi-phrases in each of these sub-libraries.

TABLE 1

| Bi-Phrase Library | No. of Bi-Phrases |
|---|---|
| $U^1$ | 77,370 |
| $U^2$ - $g^0$ | 125,379 |
| $U^2$ - $g^4$ | 340,034 |
| $U^3$ - $g^4$ | 534,107 |
| $U^4$ - $g^4$ | 569,471 |

Figure 6:
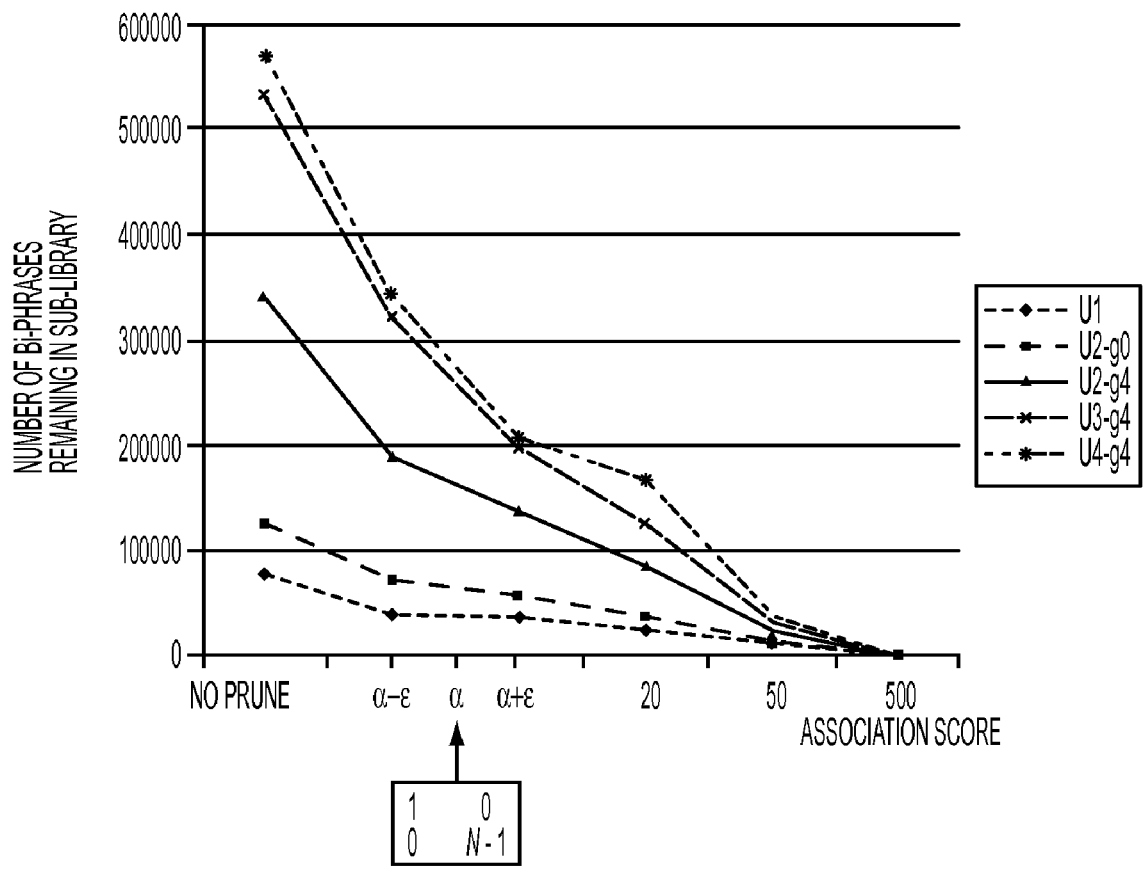
FIG. 6 illustrates the effect of the association score on the level of pruning for bi-phrase sub-libraries differing in complexity.

For each sub-library, the following procedure was applied. For each of a few predetermined threshold levels on the association score, a bi-phrase was pruned from the library according to whether its association score (computed from the contingency table of this bi-phrase in the corpus) was higher or lower than the threshold. FIG. 6 shows the effect of the association score on the level of pruning for different bi-phrase sub-libraries. The vertical axis represents the number of bi-phrases that were kept in the respective sub-library, while the horizontal axis represents the association score threshold. As the threshold increases, the number of bi-phrases pruned increases for each sub-library. In FIG. 6, the level called α represents the association score obtained for a contingency table of the form (1,0,0,N−1), this level having the property that any bi-phrase having an association score strictly larger than α necessarily appears at least twice in the corpus. ε is a small, negligible number, α−ε and α+ε allow the effect of taking a threshold just below alpha, compared to taking one just above alpha, to be assessed. As can be seen from the plots, the effect of pruning at a given threshold is different across libraries, with a steeper effect for the more complex libraries.

Figure 7:
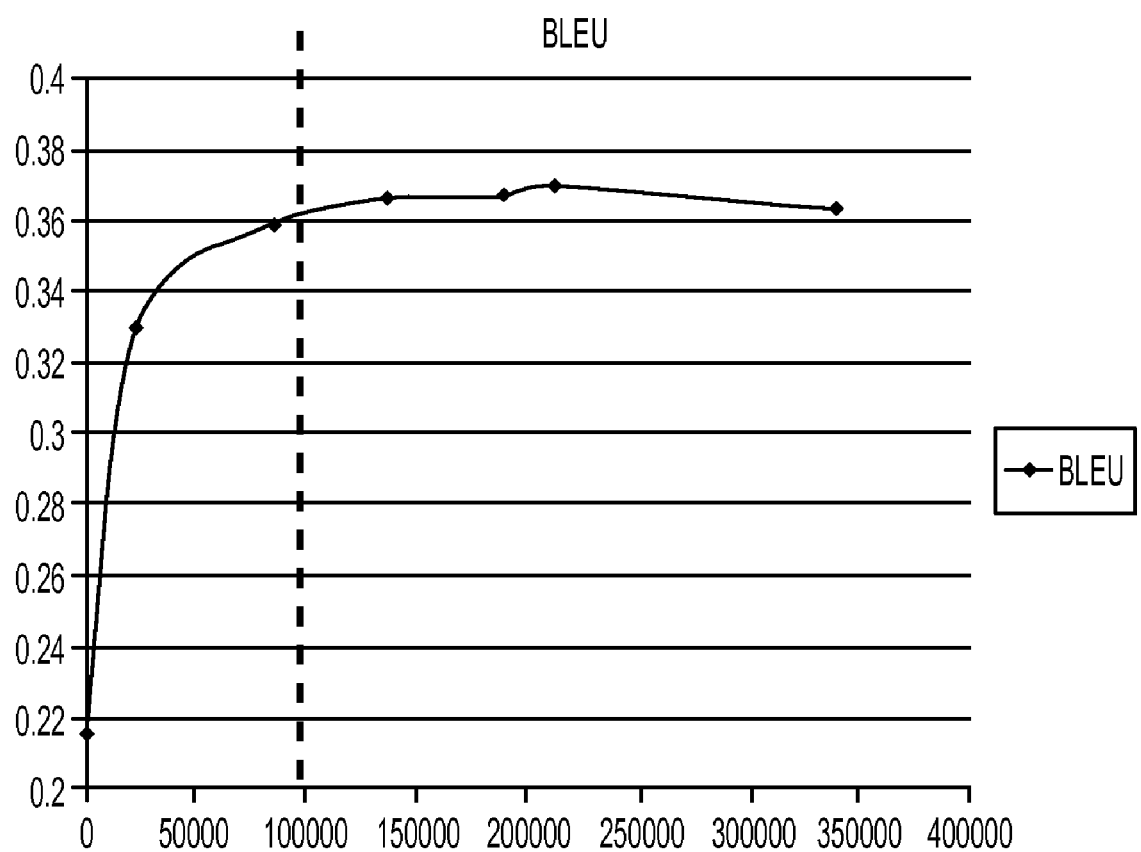
FIG. 7 illustrates the effect of pruning a bi-phrase library on translation quality, using the BLEU score as a measure of the translation quality.

Experiments were conducted in order to assess the impact of the pruning threshold on translation performance. FIG. 7 illustrates the case of the $U^4$-$g^4$ library, where the horizontal axis corresponds to the number of bi-phrases that are kept, and the vertical axis to the BLEU score that is obtained by the translation system (BLEU being a standard evaluation measure for SMT systems, a higher BLEU score representing a better translation quality). It can be seen that that by keeping only the 100,000 bi-phrases with the highest association scores, a performance is obtained which is almost indistinguishable from the performances obtained by keeping up to 350,000 bi-phrases.

Example 2

Pruning Based on Noise with Several Complexity Classes (Exemplary Method)

In this example, noise was used as the pruning criterion, along with several complexity classes for computing it from raw association scores, as described in the exemplary method. As the global bi-phrase library, the library $U^4$-$g^0$ was used, corresponding to bi-phrases obtained by combinations of up to 4 cepts, and containing no gap. The library $U^4$-$g^0$ was partitioned into 4 sub-libraries $L^1$, $L^2$, $L^3$, $L^4$, corresponding to bi-phrases containing 1, 2, 3, and 4 cepts, respectively (and no gaps). Four noise curves relating the raw association score to the noise level were then computed, one curve for each of $L^1$, $L^2$, $L^3$, $L^4$, as explained above for step S116.

Figure 8:
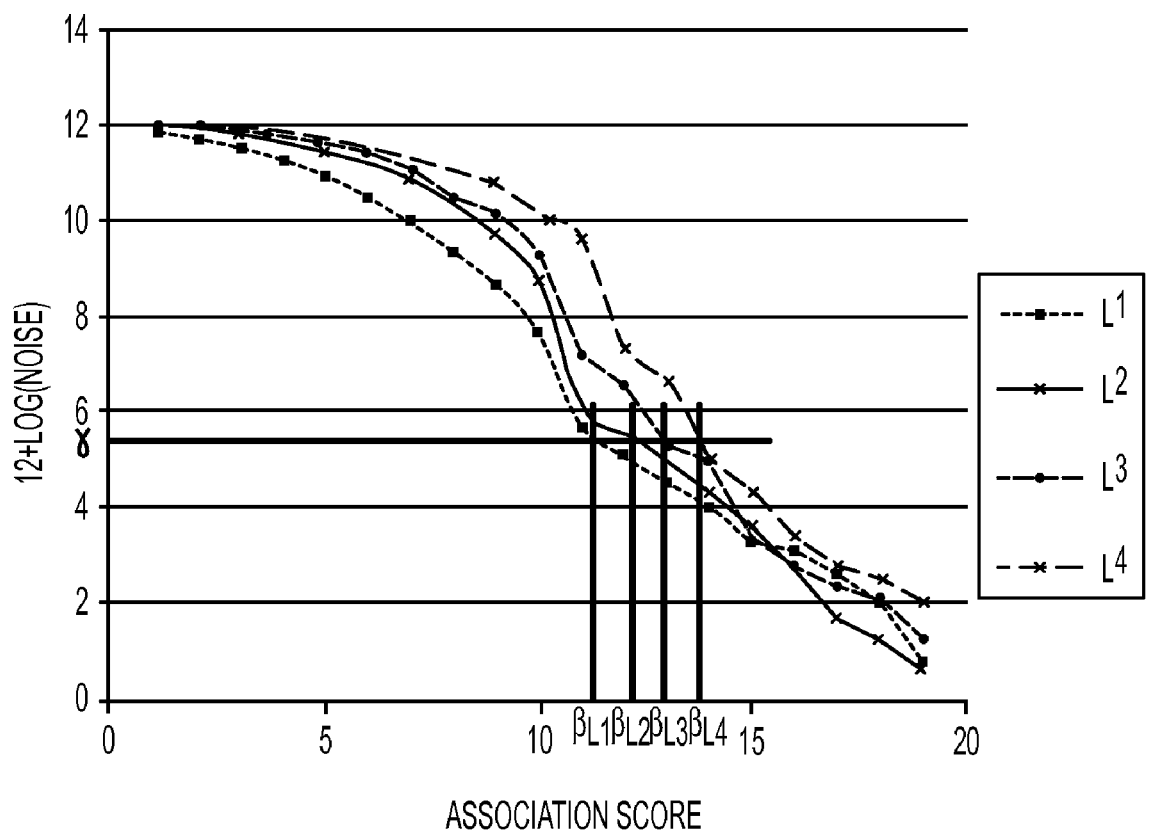
FIG. 8 shows noise plots for sub-libraries of different complexity obtained in accordance with the exemplary method and association scores for each of these sub-libraries corresponding to a selected noise threshold which may be used as a basis for pruning bi-phrases in the respective sub-libraries.

Table 2 and FIG. 8 are numerical and graphical representations of the plots corresponding to $L^1$, $L^2$, $L^3$, $L^4$.

Table 2 shows noise level as a function of the association score for the four complexity classes.

TABLE 2

| Association Score | Noise | | | |
|---|---|---|---|---|
| | $L^1$ | $L^2$ | $L^3$ | $L^4$ |
| 1 | 0.886215 | 1 | 1 | 1 |
| 2 | 0.74375 | 0.93615 | 0.96312 | 0.99234 |
| 3 | 0.606568 | 0.826641 | 0.86123 | 0.9123 |
| 4 | 0.471238 | 0.709485 | 0.79 | 0.8476 |
| 5 | 0.342752 | 0.586848 | 0.68123 | 0.7487 |
| 6 | 0.226832 | 0.456559 | 0.57745 | 0.63698 |
| 7 | 0.134101 | 0.320859 | 0.400567 | 0.5167 |
| 8 | 0.0708363 | 0.196063 | 0.22034 | 0.4065 |
| 9 | 0.0354146 | 0.1026 | 0.1543 | 0.2854 |
| 10 | 0.013129 | 0.0374584 | 0.0645 | 0.1534 |
| 11 | 0.00176128 | 0.00271371 | 0.0083454 | 0.09567 |
| 12 | 0.00100625 | 0.00157571 | 0.00434 | 0.009365 |
| 13 | 0.000556632 | 0.000932277 | 0.001232 | 0.00456 |
| 14 | 0.000341739 | 0.000464202 | 0.000859 | 0.0009567 |
| 15 | 0.000164781 | 0.000223004 | 0.000177 | 0.000476 |
| 16 | 0.000134607 | 9.14E−05 | 9.91E−05 | 0.000176 |
| 17 | 8.36E−05 | 3.29E−05 | 6.58E−05 | 9.86E−05 |
| 18 | 4.52E−05 | 2.10E−05 | 5.06E−05 | 7.46E−05 |
| 19 | 1.31E−05 | 1.12E−05 | 2.05E−05 | 4.65E−05 |

The noise level in Table 2 varies between 0 and 1. In FIG. 8, rather than plotting noise directly, a log value (12+log (Noise)) was plotted against the association score for clarifying the distinctions. As will be appreciated, once the noise plots have been generated, it is possible to experiment with different noise levels γ and see what are the consequences on the severity of pruning and on the translation performance. By a trial and error process of this nature, it was found that the optimal translation performance can be obtained for a noise level of 0.0015 (having a log equal to −6.5) indicated by the horizontal line at γ, which corresponds to four different association scores in the four curves, roughly β1=11.0 for $L^1$, β2=12.0 for $L^2$, β3=13.0 for $L^3$, β4=14.0 for $L^4$.

Using this noise level, the pruned library size and translation performance results were computed using two measures: BLEU and NIST, as shown in Table 3. The original $U^4$-g0 library included 309,908 bi-phrases. The pruned library $L^{1234}$ composed of the bi-phrases remaining in sub-libraries $L^1$, $L^2$, $L^3$, $L^4$ after pruning using the above four association scores, respectively, included a total of 108,159 bi-phrases.

TABLE 3

Pruned library size and translation performance when filtering the bi-phrases on a common noise level of 0.0015, corresponding to using the different association score thresholds 11, 12, 13 and 14 on the four sub-libraries respectively.
$L^{1234}$

| Threshold | Bi-Phrases | NIST | BLEU |
|---|---|---|---|
| 11, 12, 13, 14 | 108,159 | 6.8187 | 0.3749 |

Table 4 provides comparative results obtained using just one of the association score thresholds for filtering the entire global library $U^4$-g0.

TABLE 4

Pruned library size and translation performance when filtering the bi-phrases on a selected one of the four association thresholds 11, 12, 13 and 14.
$U^4 - g0$ (309,908 Bi-Phrases)

| Association Score Pruning Threshold | Bi-Phrases | NIST | BLEU |
|---|---|---|---|
| 11 | 126,667 | 6.7485 | 0.3680 |
| 12 | 119,569 | 6.7460 | 0.3657 |
| 13 | 112,135 | 6.7263 | 0.3652 |
| 14 | 102,461 | 6.7492 | 0.3663 |

From TABLES 3 and 4, it can be seen that when using the optimal common noise level, it is possible to prune about two thirds of the original bi-phrase library, and this would be roughly also the case if any one of the four association scores 11, 12, 13 or 14 was used as the sole criterion for pruning the library. However, none of the association score thresholds 11.0, 12.0, 13.0, 14.0, when taken as the sole criterion for pruning the library, obtains as good results (by some substantial margin on the BLEU score as well as NIST) as using the common noise level of 0.0015, corresponding to applying the four association scores separately to the four complexity classes. Thus it can be seen that computing the noise level without distinguishing between bi-phrases of different complexity (comparative method) can indeed be a suboptimal approach.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for pruning a library of bi-phrases, comprising:

partitioning a bi-phrase library for use in a machine translation system into a set of sub-libraries, the bi-phrase library including, bi-phrases, each bi-phrase including a source phrase in a source language and a target phrase in a target language which is predicted to be a translation of the source phrase;

for each of at least a plurality of the sub-libraries and for each of a plurality of association score thresholds, with a computer processor, computing values of noise as a function of expected counts and observed counts, where observed counts corresponds to a number of the bi-phrases in the sub-library having an association score above the association score threshold, and expected counts corresponds to a number of bi-phrases in the sub-library having an association score above the association score threshold under an independence hypothesis;

wherein the association score of a bi-phrase represents a statistical dependency between source and target phrases of the bi-phrase and is computed as $-\log(p\text{-value})$ of a contingency table for the bi-phrase, the contingency table including elements which represent a partition of N corpus bi-sentences into bi-sentences that contain both S and T, contain S but not T, contain T but not S, and contain neither S nor T, where N represent a number of bi-sentences in a parallel corpus from which the bi-phrases are extracted, S represents a source phrase of the bi-phrase, T represents a target phrase of the bi-phrase and wherein the p-value is computed from the contingency table using Fisher's exact test; and pruning the plurality of sub-libraries based on a common noise threshold on the noise values, including, for each sub-library, determining an association score pruning threshold corresponding to the common noise threshold, and pruning bi-phrases from the sub-library having an association score which exceeds the association score pruning threshold.

2. The method of claim 1, wherein the association scores under the independence hypothesis are computed by generating a virtual corpus, including randomly associating source and target sentences in a parallel corpus from which the bi-phrase library is extracted.

3. The method of claim 1, wherein the partitioning of the library into sub-libraries includes partitioning based on a measure of complexity of the bi-phrases.

4. The method of claim 3, wherein the complexity is based on at least one of:

a number of words in a bi-phrase;

a number of cepts in a bi-phrase; and a number of gaps in a bi-phrase as a result of the bi-phrase including at least one non-contiguous phrase.

5. The method of claim 1, wherein the noise is computed for each association score threshold for each of the plurality of sub-libraries as a ratio of expected counts to observed counts.

6. The method of claim 1, wherein the plurality of association score thresholds comprises at least 3 association score thresholds.

7. The method of claim 1, wherein the plurality of sub-libraries comprises at least 3 sub-libraries.

8. The method of claim 1, further comprising, determining the common noise threshold by pruning a plurality of sub-libraries with a plurality of noise thresholds and selecting one of the plurality of noise thresholds as the common noise threshold based on at least one of:

a) a number of bi-phrases remaining in the bi-phrase library after pruning, and b) a translation quality score computed on translations produced with a machine translation system which employs the bi-phrase library.

9. The method of claim 1, wherein the common noise threshold results in pruning bi-phrases from a first of the sub-libraries which exceed a first association score pruning threshold and pruning bi-phrases from a second of the sub-libraries which exceed a second association score pruning threshold which is higher than the first association score pruning threshold.

10. The method of claim 8, wherein the second sub-library includes bi-phrases of a higher complexity than the first sub-library.

11. A computer program product comprising a non-transitory computer-readable recording medium encoding instructions, which when executed on a computer causes the computer to perform the method of claim 1.

12. An apparatus for pruning bi-phrases comprising memory which stores instructions for performing the method of claim 1 and a processor, in communication with the memory, which executes the instructions.

13. The method of claim 1, wherein the set of sub-libraries comprises between 2-100 sub-libraries.

14. The method of claim 1, wherein the plurality of sub-libraries comprises up to 10 sub-libraries.

15. The method of claim 1, wherein the determining of the association score pruning threshold corresponding to the common noise threshold comprises generating a set of plots relating the noise level to the association score, one plot for each sub-library, and applying the common noise threshold to each plot, each association score pruning threshold corresponding to the common noise threshold.

16. The method of claim 13, wherein the set of sub-libraries comprises up to 10 sub-libraries.

* * * * *